US009891908B2

(12) United States Patent
Tverdal et al.

(10) Patent No.: US 9,891,908 B2
(45) Date of Patent: Feb. 13, 2018

(54) UPDATABLE INTEGRATED-CIRCUIT RADIO

(71) Applicant: NORDIC SEMICONDUCTOR ASA, Trondheim (NO)

(72) Inventors: Martin Tverdal, Trondheim (NO); Joel David Stapleton, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 0 days.

(21) Appl. No.: 14/775,616

(22) PCT Filed: Nov. 26, 2014

(86) PCT No.: PCT/GB2014/053500
§ 371 (c)(1),
(2) Date: Sep. 11, 2015

(87) PCT Pub. No.: WO2015/092355
PCT Pub. Date: Jun. 25, 2015

(65) Prior Publication Data
US 2016/0283220 A1    Sep. 29, 2016

(30) Foreign Application Priority Data
Dec. 20, 2013  (GB) .................................. 1322797.0

(51) Int. Cl.
G06F 9/44    (2006.01)
G06F 9/445   (2006.01)
H04W 4/00    (2009.01)

(52) U.S. Cl.
CPC ............ G06F 8/665 (2013.01); H04W 4/001 (2013.01)

(58) Field of Classification Search
CPC ................................ G06F 8/665; H04W 4/001
(Continued)

(56) References Cited

U.S. PATENT DOCUMENTS 6,023,620 A * 2/2000 Hansson .................. G06F 8/65
                                                        455/419
6,275,931 B1 * 8/2001 Narayanaswamy .. G06F 9/4406
                                                        711/4
(Continued)

FOREIGN PATENT DOCUMENTS

GB          2499003 A       8/2013
WO    WO 03/025742 A2       3/2003
WO    WO 2009/074444 A2     6/2009

OTHER PUBLICATIONS

"nRF51 Series Reference Manual Version 1.1," Mar. 2013, Nordic Semiconductor, p. 1-175.*

(Continued)

Primary Examiner — Qing Chen
(74) Attorney, Agent, or Firm — Koppel, Patrick, Heybl & Philpott

(57) ABSTRACT

An integrated-circuit radio communication device (1) comprises processing means (7), memory (13), and radio communication logic (17). The memory (13) stores (i) a boot-loader (22), (ii) a firmware module (23) in a firmware memory region, and (iii) a software application (27) in a software-application memory region. The firmware module (23) comprises instructions for controlling the radio communication logic (17) according to a predetermined radio protocol, and the software application (27) comprises instructions for invoking a radio-communication function of the firmware module (23). The boot-loader (22) or the firmware module (23) comprises instructions for using the radio communication logic (17) to receive a new firmware module (40), and the boot-loader (22) or the firmware module (23) comprises instructions for storing the new firmware module (40) in the software-application memory region such that at least a portion of the software application (27) is overwritten by the new firmware module (40). The (Continued)

boot-loader (22) comprises instructions for moving or copying the new firmware module (40) from the software-application memory region to the firmware memory region.

28 Claims, 6 Drawing Sheets

(58) Field of Classification Search
USPC .................................................. 717/168–173
See application file for complete search history.

(56) References Cited

U.S. PATENT DOCUMENTS

| | | | |
|---|---|---|---|
| 6,640,334 B1* | 10/2003 | Rasmussen | G06F 9/4401 717/169 |
| 2004/0083358 A1* | 4/2004 | Zhou | G06F 11/2028 713/100 |
| 2005/0055595 A1* | 3/2005 | Frazer | G06F 8/665 713/400 |
| 2005/0251673 A1 | 11/2005 | Bosley et al. | |
| 2007/0226448 A1* | 9/2007 | Hirayama | G06F 8/65 711/170 |
| 2009/0013317 A1 | 1/2009 | Abfaleter et al. | |
| 2009/0320012 A1 | 12/2009 | Lee et al. | |
| 2014/0007141 A1* | 1/2014 | Stapleton | G06F 8/65 719/330 |
| 2014/0351569 A1* | 11/2014 | Durand | G06F 8/65 713/1 |
| 2015/0220318 A1* | 8/2015 | Mangaiahgari | H04W 4/001 717/169 |
| 2015/0280471 A1* | 10/2015 | Farhi | H02J 7/0004 320/107 |

OTHER PUBLICATIONS

"nRF51422 Product Specification 1.0," Dec. 2012, Nordic Semiconductor, p. 1-57.*
"nRF51822 Development Kit User Guide v1.0," Sep. 2012, Nordic Semiconductor, p. 1-59.*
"nRF51822 Product Specification 1.0," Nov. 2012, Nordic Semiconductor, p. 1-57.*
"S210 nRF51422 SoftDevice Specification v0.6," Sep. 2012, Nordic Semiconductor, p. 1-18.*
UK Intellectual Property Office, Examination Report under Sections (3) dated Nov. 21, 2014 for GB1322797.0.
Uk Intellectual Property Office, Examination Report under Section 17(5) dated Jun. 10, 2014 for GB 1322797.0.
Applicant correspondence filed Mar. 23, 2015 with the UKIPO in response to UK Examination Report dated Nov. 21, 2014 for GB1322797.0.
UK Intellectual Property Office, Notification of Grant: Patent Serial No. GB2515364 (for Application No. GB1322797.0), dated May 19, 2015.
UK Patent GB2515364 dated Jun. 17, 2015.
Notification of Transmittal of the International Search Report and Written Opinion of the International Searching Authority for PCT/GB2014/053500 dated Jan. 29, 2015.

* cited by examiner

UPDATABLE INTEGRATED-CIRCUIT RADIO

This invention relates to integrated-circuit radio-communication devices and methods of updating such devices.

Integrated-circuit radio-communication devices typically integrate a processor, memory and radio communication logic on a silicon chip. An antenna may be fabricated on the silicon or may be connecting externally. The device will normally have pins for connecting it to a power supply, clock source and any external peripherals such as sensors, timers, digital-to-analog converters and output devices. The processor interfaces with the radio communication logic in order to manage the sending and/or receiving of radio messages by the device.

Such radio-communication devices can be used in a wide range of wireless products, such as wireless mice and keyboards, controllers for game consoles, bicycle speedometers, remote controls, garage-door openers, wireless loudspeakers, etc.

The processor on such a device may run software stored on non-volatile memory (e.g. EEPROM or flash) on the device in order to control the radio communication logic according to a predetermined radio protocol, such as Bluetooth™ or ZigBee™.

One example of such a device is the applicant's nRF51822 radio-on-a-chip. This includes a radio transceiver as well as a 32-bit ARM™ Cortex™ M0 CPU with 256 kB of embedded flash memory and 16 kB of RAM. It can be supplied to customers with a precompiled and linked binary firmware module already loaded into the flash memory, or the firmware module may be supplied as a binary image for the customer to load onto the device. The firmware module can provide software control of the radio, as well as other functions. A customer can also then add its own software applications to the flash memory, as a separate, pre-linked binary module, before shipping a final product to end users that incorporates the integrated radio device (e.g. a wireless computer keyboard).

The applicant has recognised that it may be desirable to change or update code in the firmware module (e.g. to add new features, or to fix bugs), even after the firmware module and software application have been loaded onto a device. In some instances, it may be desirable to change such code when the device is in the possession of an end user.

The present invention seeks to provide an efficient approach to facilitating such code updating.

From a first aspect, the invention provides a method of updating an integrated-circuit radio communication device, wherein:
   the device comprises processing means, memory, and radio communication logic; and
   the memory stores (i) a boot-loader, (ii) a firmware module in a firmware memory region, and (iii) a software application in a software-application memory region, the firmware module comprising instructions for controlling the radio communication logic according to a predetermined radio protocol, and the software application comprising instructions for invoking a radio-communication function of the firmware module,
the method comprising:
   the processing means executing instructions from the boot-loader or the firmware module to use the radio communication logic to receive a new firmware module, and executing instructions from the boot-loader or the firmware module to store the new firmware module in the software-application memory region such that at least a portion of the software application is overwritten by the new firmware module; and
   the processing means executing instructions from the boot-loader to move or copy the new firmware module from the software-application memory region to the firmware memory region.

From a second aspect, the invention provides an integrated-circuit radio communication device comprising:
   processing means;
   memory; and
   radio communication logic,
wherein:
   the memory stores (i) a boot-loader, (ii) a firmware module in a firmware memory region, and (iii) a software application in a software-application memory region, the firmware module comprising instructions for controlling the radio communication logic according to a predetermined radio protocol, and the software application comprising instructions for invoking a radio-communication function of the firmware module;
   the boot-loader or the firmware module comprises instructions for using the radio communication logic to receive a new firmware module, and the boot-loader or the firmware module comprises instructions for storing the new firmware module in the software-application memory region such that at least a portion of the software application is overwritten by the new firmware module; and
   the boot-loader comprises instructions for moving or copying the new firmware module from the software-application memory region to the firmware memory region.

Thus it will be seen by those skilled in the art that, in accordance with the invention, an integrated-circuit radio communication device can use an existing firmware module to receive a new firmware module by radio, and can use a software-application memory region as temporary storage for the new firmware module, before updating or replacing the old firmware module with the new firmware module. In this way, there is no need to reserve a dedicated memory region for receiving the new firmware module. This is desirable because a larger memory requirement would add to the size and cost of the device. The updating can also be conveniently performed by an end user, because it can be performed wirelessly, without requiring the radio device to be connected by cable to a host computing device.

In a preferred set of embodiments, the boot-loader or the new firmware module comprises instructions for using the radio communication logic to receive a new software application, and the boot-loader or the new firmware module comprises instructions for storing the new software application in the software-application memory region. If a copy of the old firmware module remains in the software-application memory region when the new software application is received, preferably at least a portion of the old firmware module is overwritten by the new software application. This new software application may be identical to the old software application, or it may contain at least some differences, such as new code or deleted code.

The new firmware module may completely overwrite the old software application when it is stored in the software-application memory region. This may be the case when the new firmware module is larger than the software application, for instance.

The memory may comprise any one or more of: ROM, non-volatile memory, and volatile memory. In some embodiments it comprises or consists of non-volatile, read-write memory, such as EEPROM, flash (e.g. NOR-type flash), or any other appropriate technology. The firmware memory region and/or the software-application memory region preferably each comprise or consist of non-volatile, read-write memory. The memory preferably allows random access so that code can be executed directly from the memory (although this is not essential). The processing means preferably executes instructions in the firmware module and/or in the software application directly from the memory, possibly via a processor cache, but without first copying the entire firmware module or software application to RAM. The memory may comprise pages that are individually erasable. A non-volatile portion of the memory may be such that it cannot be erased on a finer scale than a page; e.g. not at an individual bit, byte or word level. Erasing here means resetting the memory contents to a default state (typically either all binary "1"s or all binary "0"s), from which the state of individual bits or bytes may be changed in a write operation.

Overwriting may comprise performing an erase operation followed by a write operation, or it may be performed as a single operation, depending on the memory type.

The device preferably also comprises volatile memory, such as RAM. However, in preferred embodiments the amount of RAM, or the amount of available RAM, is smaller than the software-application memory region. The new firmware module may typically be larger than the RAM or available RAM. The storing of the new firmware module to the software-application region preferably overlaps in time with the receiving of the new firmware module.

The firmware memory region preferably occupies a single, continuous range of memory addresses; however, this is not essential, and the firmware memory region may comprise two or more non-contiguous sub-regions. Similarly, the software-application memory region preferably occupies a single, continuous range of memory addresses; however, this is not essential, and the software-application memory region may comprise two or more non-contiguous sub-regions. The firmware memory region is preferably distinct from the software-application memory region (i.e. not overlapping).

The software application is preferably located at a predetermined software-application memory address (i.e. some or all of the software application occupies a range of memory addresses, extending from the predetermined memory address). This predetermined address may be provided to the developer of the software application, for use when linking and/or loading the software application onto the device. It may be used by the firmware module, e.g. for forwarding interrupts to the software application.

The new firmware module is preferably stored at, or approximately at, the same predetermined software-application memory address when it is written to the software-application memory region (i.e. some or all of the new firmware module occupying a range of memory addresses, extending from the software-application memory address). This provides a particularly efficient use of memory, by ensuring a maximal overlap with the overwritten software application.

The boot-loader or the new firmware module preferably comprises instructions for writing a new software application to the predetermined software-application memory address.

The (old) firmware module is preferably located at a predetermined firmware memory address (i.e. some or all of the firmware module occupies a range of memory addresses, extending from the predetermined firmware memory address). The new firmware module is preferably moved or copied to be located at the same predetermined firmware memory address (i.e. some or all of the new firmware module occupying a range of memory addresses, extending from the firmware memory address). Each of the firmware modules and/or software application may comprise data as well as instructions; each may comprise an interrupt vector table. The new firmware module may be smaller than the old firmware module, or larger than it, or they may be substantially the same size as each other.

In some embodiments some or all of the software-application memory region may be erased after the new firmware module is moved to the firmware memory region. In other embodiments, a copy of the new firmware module may be left in the software-application memory region, to be erased or overwritten later (e.g. after a device reset, or when a new software application is loaded).

The boot-loader may be stored in ROM or in read-write memory such as flash. It is preferably relatively small compared with the firmware module (e.g. approximately one tenth the size or less). In one set of embodiments, the boot-loader may be approximately 4 kB in size, while the firmware module may be approximately 80 kB or more in size. The boot-loader may be located in the firmware memory region, or in a distinct boot-loader memory region. The boot-loader is preferably stored in one or more individually erasable memory pages, not used for storing the firmware module. This can enable particularly efficient erasing or overwriting of the old firmware module, without affecting the boot-loader code.

The processing means may be arranged to execute one or more instructions in the boot-loader after power-on or after a reset. The boot-loader may have functions other than updating the device, but in at least some embodiments it provides no other functions. In some embodiments, the boot-loader contains no instructions for using the radio communication logic directly (i.e. for directly invoking actions by the radio communication logic, without passing execution to the firmware module or to the software application). This can allow the boot-loader to remain as simple and small as possible, minimising the chance of bugs occurring in the boot-loader code. Instead, the boot-loader may transfer execution to the old firmware module and/or to the new firmware module when radio communication is required. In some embodiments the boot-loader comprises instructions to cause execution to branch to the firmware module or to the software application (e.g. after power-on or after reset) whenever a valid firmware module and software application are already loaded on the device.

The processing means may take any form, but in some preferred embodiments it comprises, or is, a processor designed by ARM™, such as a processor from the ARM™ Cortex™-M family (e.g. a Cortex™-M0). The device may comprise a plurality of processors, e.g. two or more, which may share the instruction execution in any appropriate way. In some embodiments, instructions from the firmware module may be executed by a first processor, and instructions from the software application may be executed by a second processor, different from the first processor. The radio communication logic is preferably physically and/or logically separate from the processor. It may comprise analog and/or digital circuitry. The device may comprise an integrated antenna, or it may comprise a connection for an off-chip antenna. The device may comprise connections for connecting various external components such as resistors, capacitors, power supply, amplifier, radio antenna, crystal oscillator, sensors, output devices, etc.

In preferred embodiments, the firmware module is a pre-linked binary image. The software application is preferably also a pre-linked binary image. Preferably, no linking between the firmware module and the software application takes place. In some embodiments the software application transfers control to the firmware module (e.g. to invoke a radio function) by causing the processing means to execute a supervisor call instruction, which generates an interrupt that is handled by the firmware module.

This separation between firmware module and software application enables the old software application to be easily overwritten by the new firmware module without corrupting the old firmware module. This would not be straightforward if the firmware module and software application were compiled and/or linked together into a single binary image, since there is unlikely to be an easily-identifiable region of memory that contains only software-application code. That is not to say that it is impossible (for instance, through the careful use of linker directives), and arrangements in which the firmware module is integrally linked to the software application are not excluded.

The device may comprise memory protection logic which can prevent code in the software-application memory region from directly accessing (reading and/or writing to and/or executing) addresses in the firmware memory region.

In some embodiments, the software application comprises instructions for causing the processor to execute instructions in the firmware module for using the radio communication logic to receive a new firmware module. The software application may transfer control directly to the firmware module (e.g. by a system call), or it may pass control to the boot-loader, which may in turn invoke the necessary firmware module function or functions. This allows the software application to decide whether or when to initiate a firmware update; e.g. in response to a signal from a human user, or in response to a message, received by radio, from a remote device, such as a smartphone.

The software application may comprise instructions for passing information to the boot-loader or to the firmware module (e.g. as one or more function parameters) that allows the device to re-establish radio connection with a remote device, e.g. in case of a radio communication problem while receiving the new firmware module, or in case the device is unexpectedly reset (e.g. due to a power failure). This information may comprise bonding information, such as any one or more of: a device address, radio channel, authentication information, and encryption information. This can be important because the software application may start to be overwritten (and no longer be executable) when the new firmware module starts being received by the device. The bonding information may also be used by the device for receiving a new software application from the remote device. The boot-loader may save the bonding information and use it for receiving the new software application, or the old firmware module may make the bonding information available to the new firmware module, e.g. by storing it to a predetermined memory location.

The boot-loader or firmware module preferably comprises instructions for checking that the new firmware module has been correctly received and/or correctly stored in the software-application memory region. This may comprise verifying a checksum for the new firmware module or verifying a cryptographic signature. Authentication information for the new firmware module, such as a checksum or digital signature, may be provided to the device by the remote device; e.g. accompanying the new firmware module or embedded in the new firmware module. The boot-loader or firmware module may comprise instructions for using the radio communication logic to signal to a remote device when the check fails. It may ask the remote device to retransmit the new firmware module.

Once the new firmware module has been correctly stored, the old firmware module may return or transfer control to the boot-loader. This may be by a direct branch, or by triggering an interrupt, or by causing the device to reset, or any other suitable mechanism.

The boot-loader may erase the old firmware module (e.g. by erasing the entire firmware memory region) and then read the new firmware module from the software-application memory region and write it to the firmware memory region. It may then transfer control to the new firmware module (before or after receiving a new software application).

If a new software application is subsequently received, under instructions of the boot-loader or the new firmware module, this may be written directly to the software-application memory region. The storing of the new software application to the software-application region preferably overlaps in time with the receiving of the new software application. The boot-loader or new firmware module preferably comprises instructions for checking that the new software application has been correctly received and/or correctly stored in the software-application memory region. This may comprise verifying a checksum or cryptographic signature for the new software application. The boot-loader or firmware module may comprise instructions for using the radio communication logic to signal to a remote device when the check fails. It may ask the remote device to retransmit the new software application.

A new software application may be received in a same radio communication session as the new firmware module. Alternatively, a new software application may not be received until a later radio communication session. It may be received from a different remote device than the new firmware module.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which.

Figure 1:
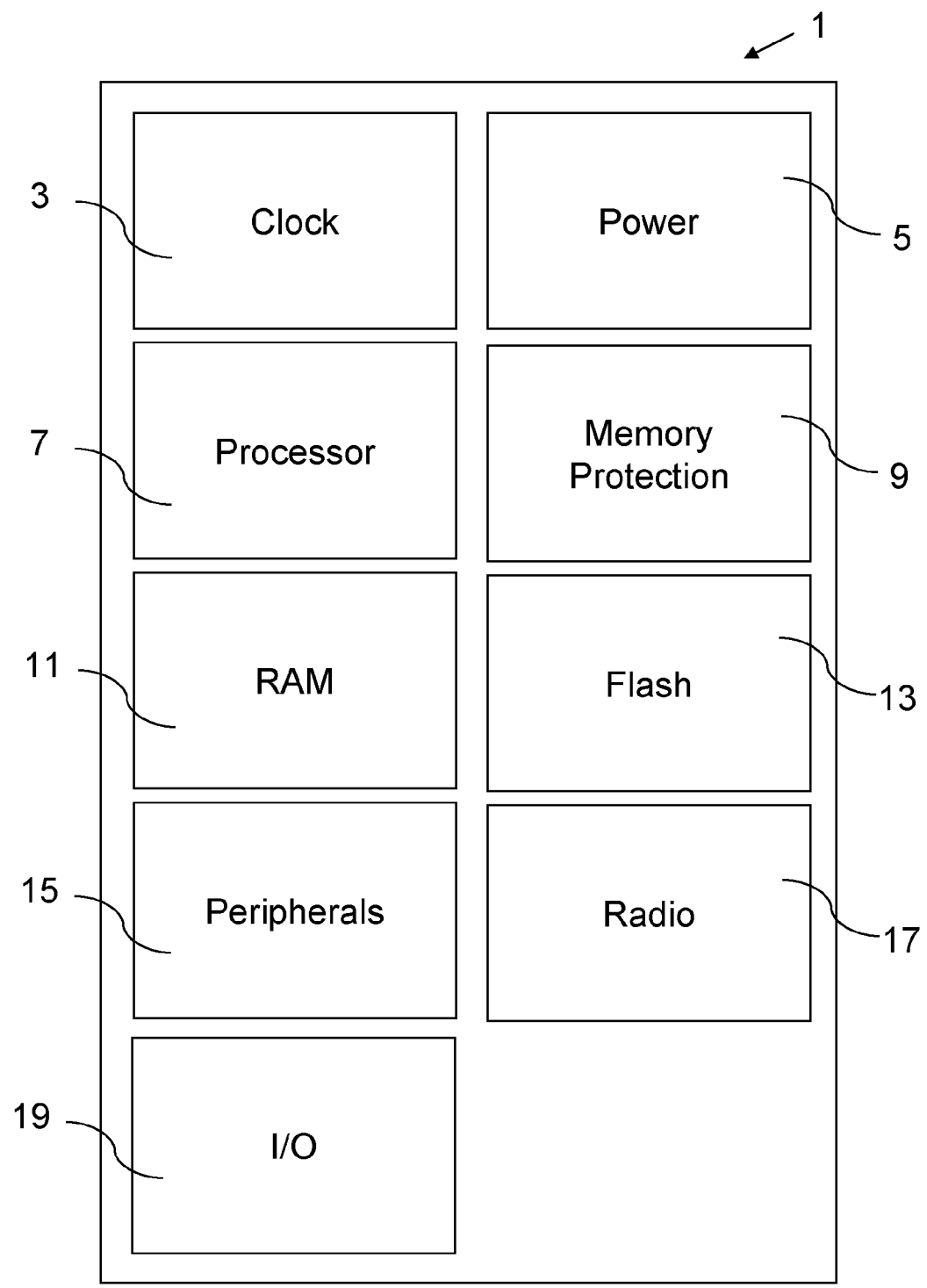
FIG. 1 is a schematic drawing of a microcontroller embodying the invention.

FIG. 1 shows an integrated-circuit microcontroller 1, sometimes known as a radio-on-a-chip. It may be incorporated into a product such as a wireless heart-rate monitor. The microcontroller 1 comprises clock logic 3, which may include a resistor-capacitor oscillator and/or may receive an input from an off-chip crystal oscillator (not shown), power management circuitry 5, a processor 7 (e.g. an ARM™ Cortex™-M0), memory protection logic 9, RAM 11, non-volatile flash memory 13, one or more peripherals 15, radio communication logic 17 and input/output circuitry 19.

The processor 7, RAM 11 and flash memory 13 are interconnected in a conventional manner, e.g. using lines and buses (not shown). The memory protection logic 9 is situated so as to intercept instructions from the processor 7 to the RAM 11 and flash memory 13. When installed in a product, the microcontroller 1 may be connected to a number of external components such as a power supply, radio antenna, crystal oscillator, capacitors, sensors, audio/visual output devices, etc. (not shown).

Figure 2:
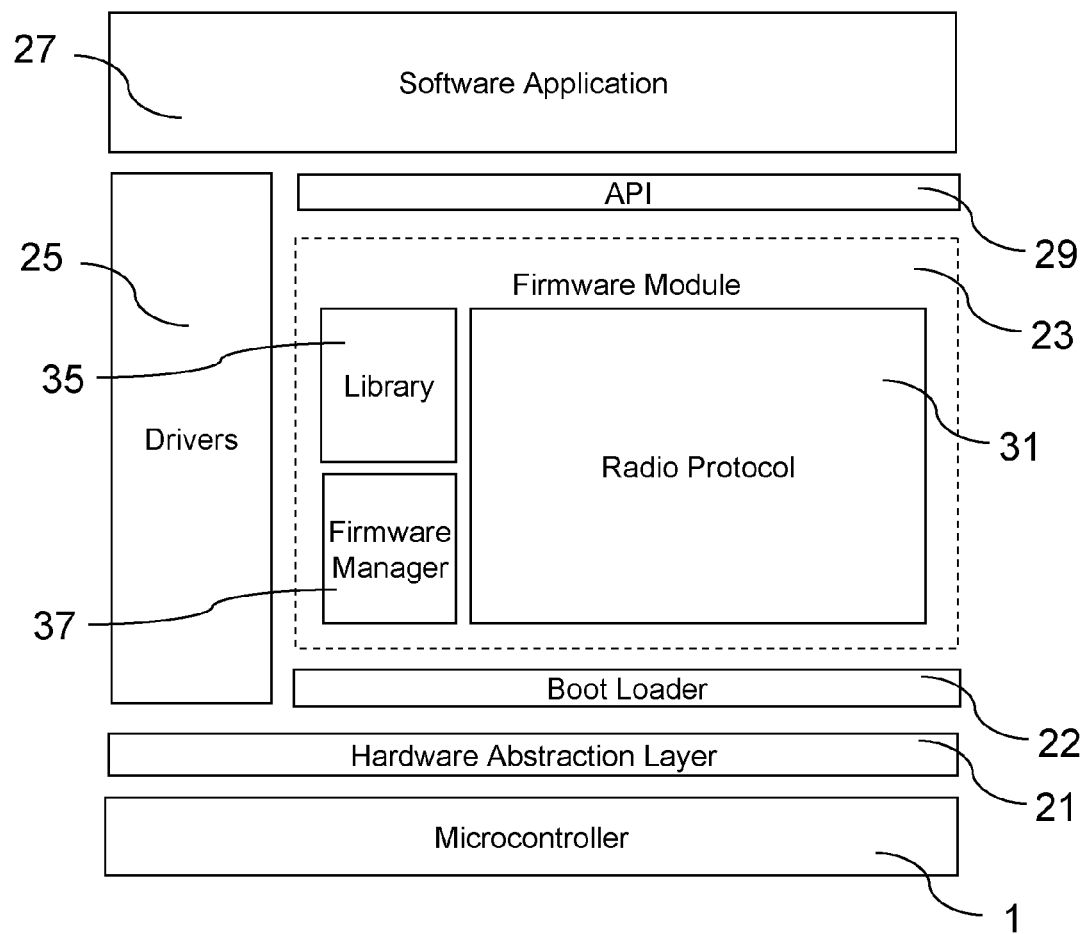
FIG. 2 is a schematic drawing showing major software components within the microcontroller architecture.

FIG. 2 shows the major components of the software architecture. These include an optional hardware abstraction layer 21, such as the ARM™ Cortex™ Microcontroller Software Interface Standard, a boot-loader 22, a firmware module 23, drivers 25 and a software application 27. The drivers 25 may be dedicated to the software application 27.

The boot-loader 22 is a small binary application, located in the flash memory 13. It contains instructions for managing over-the-air software updates. The boot-loader 22 is the entry point after all resets. Normally it passes control straight to the firmware module 23, unless an update is in progress.

The firmware module 23 is a linked binary application comprising a number of embedded software blocks. A radio protocol block 31 implements one or more wireless protocol stacks, such as Bluetooth Low Energy™. A library 35 provides shared hardware resource management and functions such as random number generation, configuring interrupts and priority, power management (e.g. for enabling and disabling peripherals), encryption functions, etc. A firmware manager 37 supports enabling and disabling the firmware module, and enabling and disabling the wireless protocol stack. The firmware module 23 owns the system vector table.

An application programming interface (API) 29 for the firmware module 23 allows the software application 27 to invoke functions in the firmware module 23. It is implemented using signals supervisor call instructions to pass control from the software application 27 to the firmware module 23. These cause process interrupts which can be handled in the firmware module 23. The firmware module 23 can communicate events to the software application 27 using software interrupts.

The software application 27 can access the microcontroller 1 hardware directly, or via a hardware abstraction layer 21, e.g. by means of application-specific drivers 25, in addition to being able to use the firmware module 23 to use the hardware indirectly.

Figure 3:
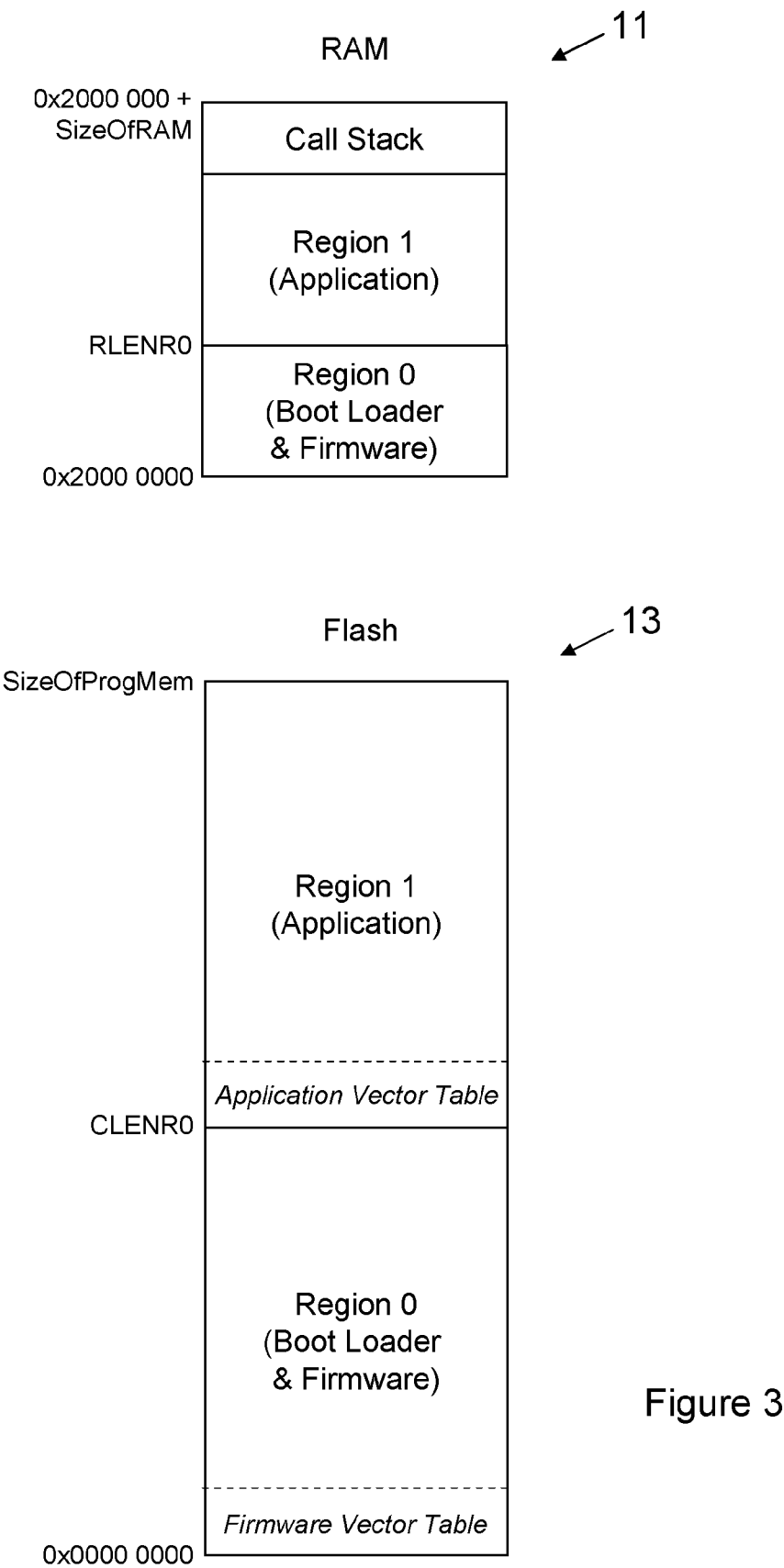
FIG. 3 is a schematic memory map for the microcontroller.

FIG. 3 shows how the RAM 11 and flash 13 are shared between the firmware module 23 and the software application 27 (including any application-specific drivers 25). When using an ARM™ Cortex™-M0 processor 7, the flash 13 is assigned addresses from zero (0x0000 0000) upwards, to its capacity, SizeOfProgMem and the RAM 11 is assigned addresses from 0x2000 0000 upwards to (0x2000 0000+ SizeOfRAM). Different address values may of course be used in other embodiments.

The flash 13 comprises two distinct regions either side of address CLENR0 (code length region 0). Region 0, between zero and CLENR0, is where the boot-loader 22 and the firmware module 23 are located. The firmware module's interrupt vector table is stored at address zero. Region 1, extending upwards from CLENR0, is where the software application 27 and any application data are located. It too has an interrupt vector table, at address CLENR0 for receiving forwarded interrupts from the firmware module 23 (and possibly from the boot-loader 22). It will be appreciated that the device 1 may have other non-volatile memory (not shown) which may be used for other purposes, such as storing configuration information or flags.

The RAM 11 similarly has a Region 0, from the base address 0x2000 000 to RLENR0, and a Region 1, extended upwards from RLENR0. RAM Region 0 provides data storage for the boot-loader 22 and firmware module 23 while RAM Region 1 provides data storage for the software application 27. A call stack is shared between the firmware module 23 and the software application 27 and grows downwards, e.g. from 0x2000 0000+SizeOfRAM. The memory allocated to the call stack must be big enough for the needs of both the software application 27 and the firmware module 23. The predetermined shared memory address may be in Region 1 of the RAM 11, or may be located elsewhere in the RAM 11, outside Regions 0 and 1.

The memory protection logic 9 is arranged to intercept all memory access requests (e.g. read requests) from the processor 7 to the flash 13 and the RAM 11. It determines the source of the access request instruction (e.g. whether the request is from the firmware module 23 or from the software application 27). It also accesses memory protection configuration data (e.g. stored in one or more dedicated registers) which specifies respective access permissions for the various sources, and allows or denies the access request accordingly.

In some preferred embodiments of the invention, the software application 27 is denied read and/or write access to flash Region 0 and to RAM Region 0. This protects confidentiality for the firmware module 23 and can prevent inadvertent or malicious writing by the software application 27 to memory locations allocated to the firmware module 23, thereby increasing robustness and security. The software application flash Region 1 may also be protected from read access, e.g. to protect against read back via an external debugging interface.

Figure 4:
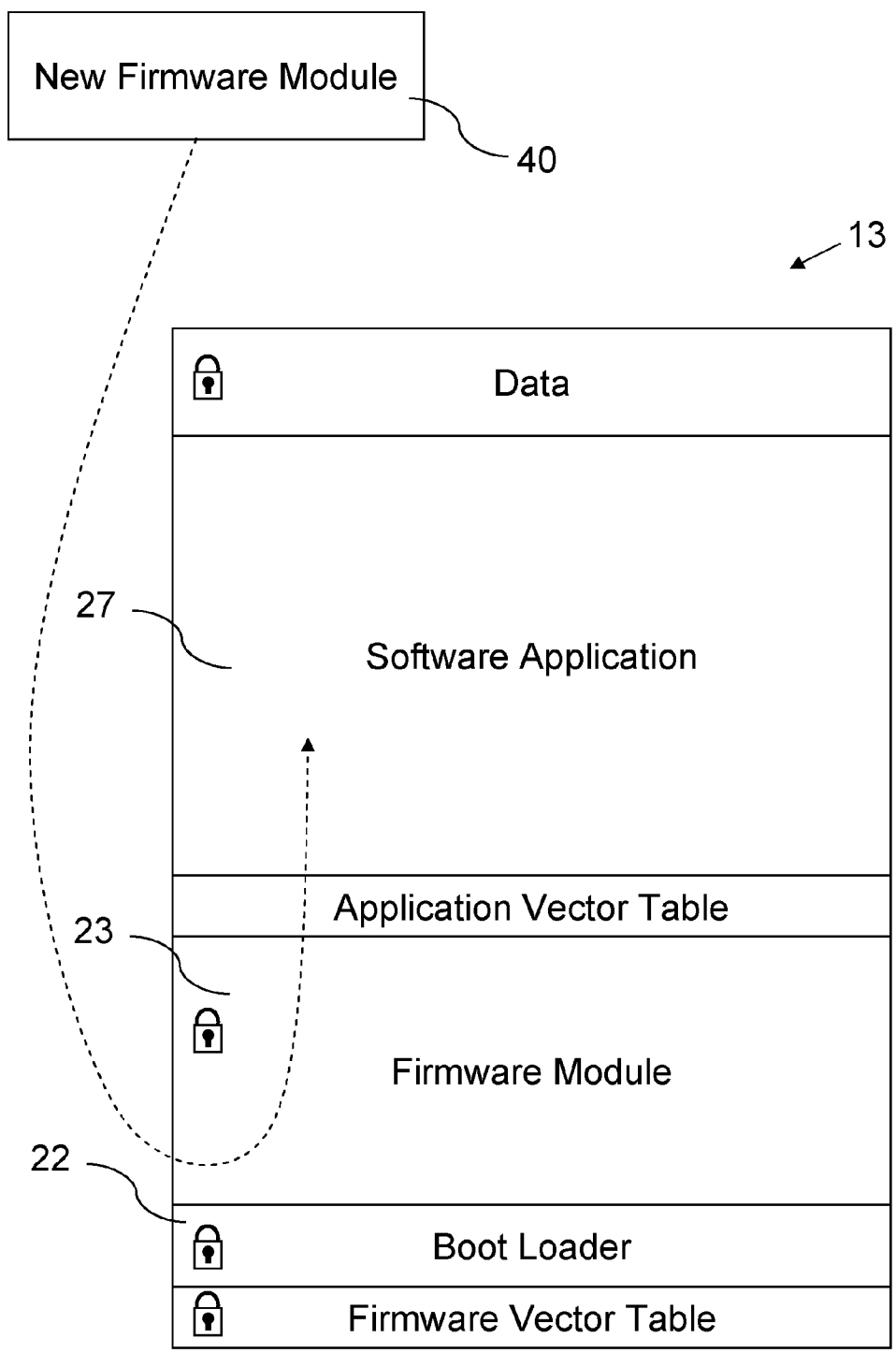
FIG. 4 is a schematic drawing of the non-volatile memory, showing a first stage in updating the microcontroller.
Figure 5:
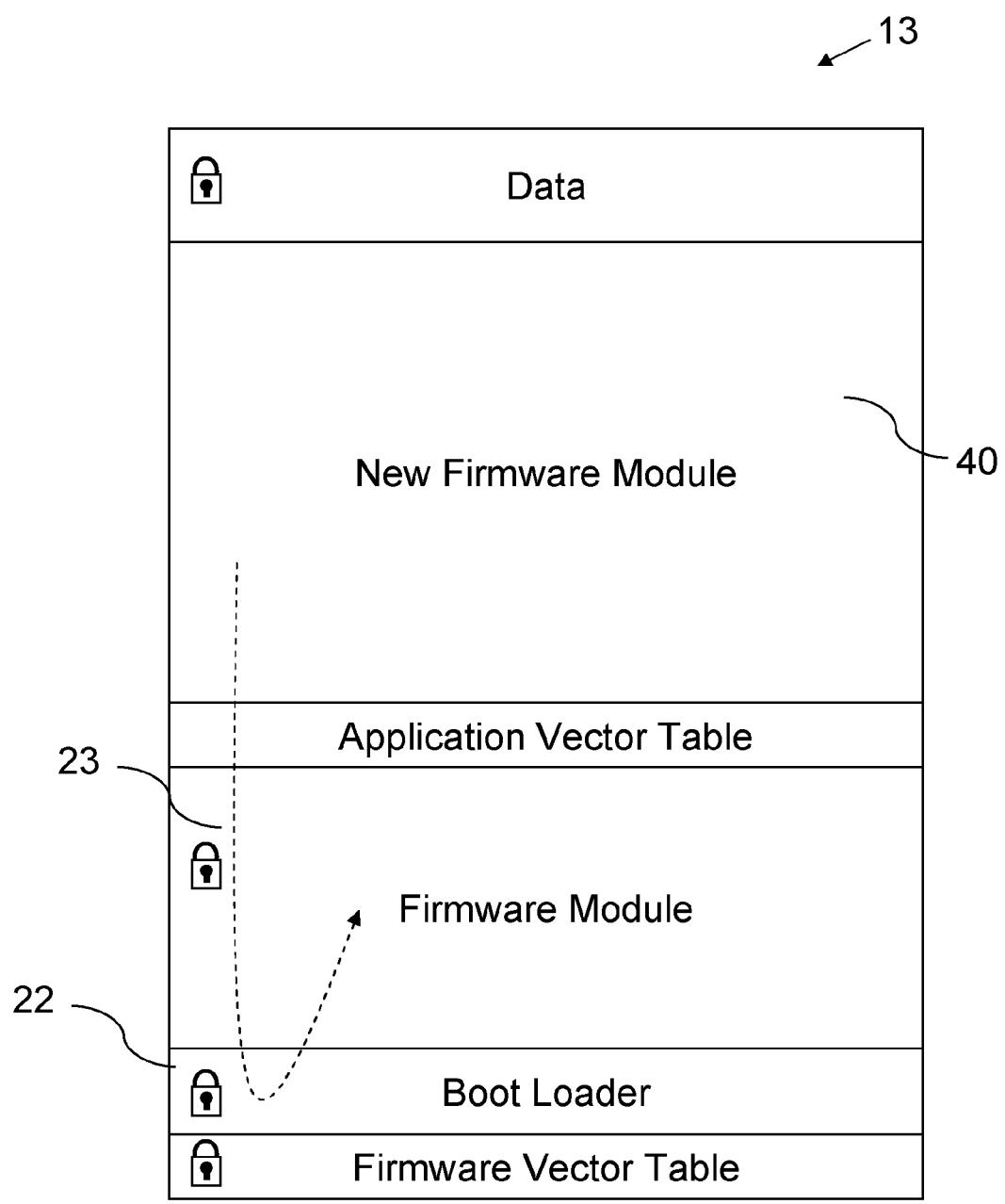
FIG. 5 is a schematic drawing of the non-volatile memory, showing a second stage in updating the microcontroller.
Figure 6:
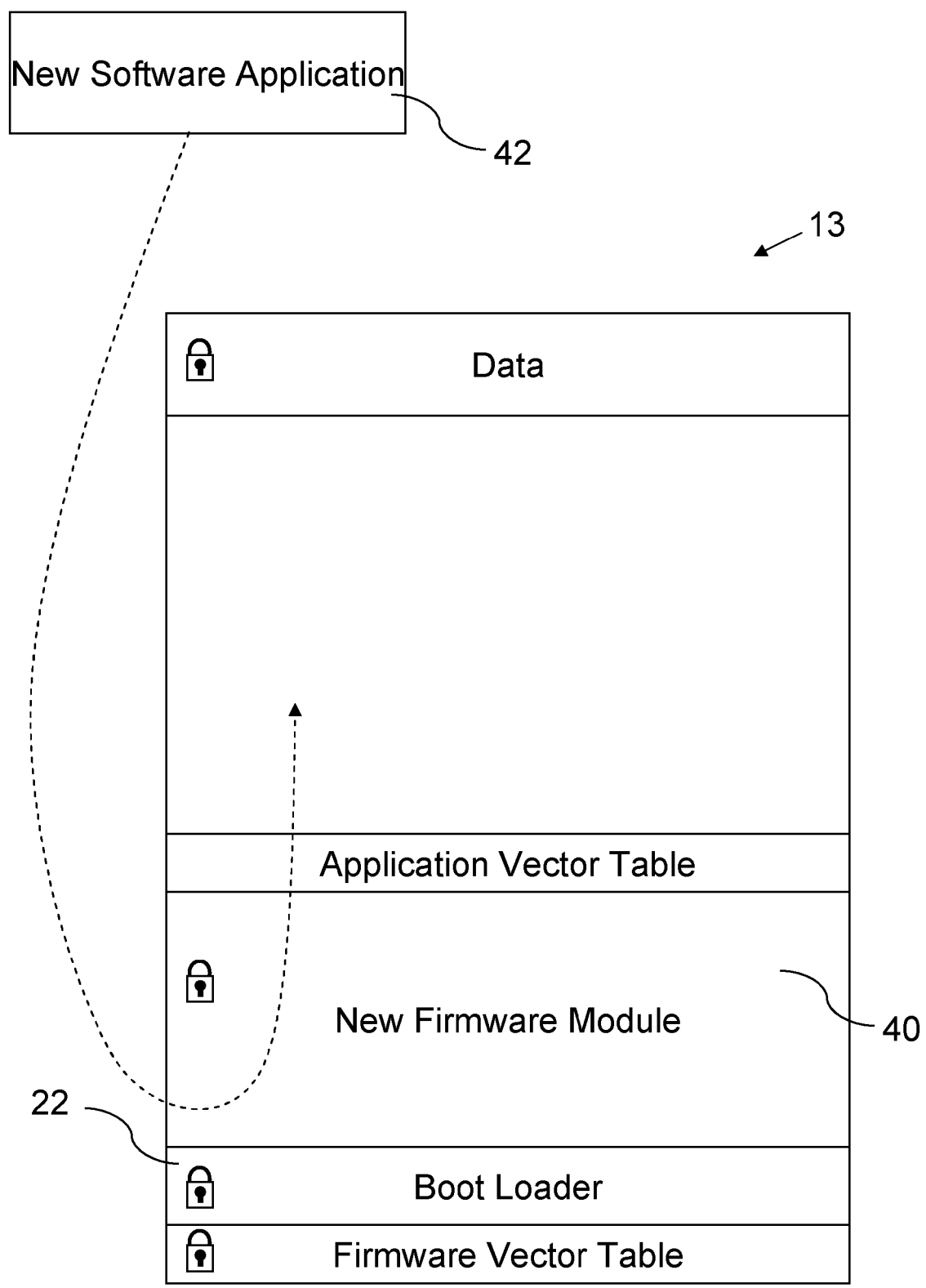
FIG. 6 is a schematic drawing of the non-volatile memory, showing a third stage in updating the microcontroller.

FIGS. 4 to 6 show the updating of the firmware module and software application on the device 1. Padlock symbols indicate areas of memory for which some level of access protection is enforced by the memory protection logic 9.

The software application 27 initiates the update process by calling an update function in the boot-loader 22. The software application 27 passes radio-protocol bonding information for a remote, peered device to the boot-loader 22. The peer device may be a smartphone or a laptop computer, for example. The bonding information can be used by the microcontroller 1 to reconnect to the peer device, in case of disconnection. The boot-loader 22, or the software application 27, then passes control to the firmware module 23 (e.g. by using a system call to invoke an update operation in the firmware module 23). Once the firmware module 23 has control, it uses the radio communication logic 17 to request the new firmware module 40 from the peer device.

As shown in FIG. 4, the firmware module 23 starts to receive the new firmware module 40. It may temporarily buffer some of the received data in RAM, but it also starts writing the new firmware module 40 to Region 1 of the flash memory 13, which previously held the software application 27, as it receives it. The software application 27 (including the application vector table) may be entirely erased before the writing starts, or it may be erased a page at a time as needed.

Once the entire new firmware module 40 has been received and written to the flash memory 13, the old firmware module 23 verifies a checksum, received from the peer device, for the new firmware module 40. If the checksum is not correct, the old firmware module 23 requests retransmission of the new firmware module 40 by the peer device.

If the microcontroller 1 is unexpectedly reset while receiving the new firmware module 40 (e.g. due to a power failure), execution will resume in the boot-loader 22, which will instruct the firmware module 23 to request the new firmware module 23 again from the peer device.

Once the checksum for the new firmware module 40 is correct, the firmware module 23 passes control to the boot-loader 22. The boot-loader 22 disconnects from the remote peer device and erases the old firmware module 23 (and its vector table) from Region 0 of the flash memory 13. It does not, of course, erase the boot-loader 22 code in Region 0. To facilitate this, the boot-loader 22 is preferably stored in its own flash page or pages, separate from the rest of Region 0, so that it is straightforward to erase all of Region 0 except for the page or pages containing the boot-loader 22.

As shown in FIG. 5, the boot-loader 22 then copies the new firmware module 40 from Region 1 to the relevant addresses in Region 0.

The boot-loader 22 then invokes a function in the new firmware module 40 (e.g. through a system call) instructing it to reconnect to the remote peer device by radio, and to request transmission of a new software application 42. The boot-loader 22 passes the radio bonding information to the new firmware module 40 to enable it to do this.

As shown in FIG. 6, the new firmware module 40 starts to receive the new software application 42. It may temporarily buffer some of the received data in RAM, but it also starts writing the new software application 42 (including the application vector table) to Region 1 of the flash memory 13 as it receives it. Region 1 may be entirely erased before the writing starts, or it may be erased a page at a time as needed. On completion, the boot-loader 22 verifies a checksum, received from the peer device, for the new software application 42. If the checksum is not correct, the boot-loader 22 requests retransmission of the new software application 42 by the peer device.

If the microcontroller 1 is unexpectedly reset while receiving the new software application 42 (e.g. due to a power failure), execution will resume in the boot-loader 22, which will instruct the new firmware module 40 to request the new software application 42 again from the peer device.

Once the checksum for the new software application 42 is correct, the boot-loader 22 passes control to the new software application 42 so that the microcontroller 1 can start using the new software application 42 and the new firmware module 40 in a normal way.

In this arrangement, the boot-loader 22 is responsible for invoking suitable functions in the old and new firmware modules in order to carry out the update, including passing the bonding information as needed, and recovering from unexpected resets.

In an alternative set of embodiments, the old firmware module 23 may be responsible for saving the bonding information and remembering the state of the update process. The old firmware module 23 may write the new firmware module 40 to Region 1 and verify that it has been correctly received. The boot-loader 22's main or only task in the updating process may simply be to copy the new firmware module 40 from Region 1 to Region 0. If the microcontroller 1 gets an un-expected reset (e.g. a power failure), before the old software application 27 has been fully overwritten by the new firmware module 40, execution will resume in the boot-loader 22, which simply passes control to the old firmware module 23. The old firmware module 23 maintains state so that is knows it must start receiving the new firmware module 40 over again, and uses the bonding information stored in memory to request the new firmware module 23 again. The old firmware module 23 writes the bonding information to an appropriate memory region (e.g. in RAM or preferably in a persistent data storage area in the flash), so that it can be accessed by the new firmware module 40.

Once the new firmware module 40 has been correctly received and copied to Region 0 by the boot-loader 22, the boot-loader 22 passes control to the new firmware module 40. The new firmware module 40 is arranged to know when it starts for the first time, and responds by connecting to the peer device and receiving the new software application 42. The old firmware module 23 must previously have written the bonding information to an appropriate memory region (e.g. in RAM or preferably in a persistent data storage area in the flash), so that the new firmware module 40 is able to access it for reconnecting to the peer device.

Alternatively, the new firmware module 40 may establish new bonding information with the same remote device, or with a different remote device, in order to receive the new software application 42. This may happen immediately after the new firmware module 40 has been received, or after a time delay.

The invention claimed is:

1. A method of updating an integrated-circuit radio communication device, wherein:

the integrated-circuit radio communication device comprises a processing system, a non-volatile memory, and radio communication logic; and the non-volatile memory stores (i) a boot-loader, (ii) an old firmware module in a firmware memory region of the non-volatile memory, and (iii) an old software application in a software application memory region of the non-volatile memory, wherein the old firmware module comprises instructions configured to control the radio communication logic according to a predetermined radio protocol, and wherein the old software application comprises instructions configured to invoke a radio communication function of the old firmware module, the method comprising:

the processing system executing instructions from the boot-loader or the old firmware module to use the radio communication logic to receive a new firmware module, and executing instructions from the boot-loader or the old firmware module to store the new firmware module in the software application memory region of the non-volatile memory such that at least a portion of the old software application is overwritten by the new firmware module; and the processing system executing instructions from the boot-loader to move or copy the new firmware module from the software application memory region of the non-volatile memory to the firmware memory region of the non-volatile memory;

wherein the boot-loader or the new firmware module comprises instructions configured to use the radio communication logic to receive a new software application, and wherein the boot-loader or the new firmware module comprises instructions configured to store the new software application in the software application memory region of the non-volatile memory.

2. The method of claim 1, wherein the old software application is completely overwritten by the new firmware module.

3. The method of claim 1, wherein the storing of the new firmware module in the software application memory region of the non-volatile memory overlaps in time with the receiving of the new firmware module.

4. The method of claim 1, wherein the old software application is located at a predetermined software application memory address, and wherein the method comprises storing the new firmware module at the predetermined software application memory address.

5. The method of claim 4, wherein the old firmware module is arranged to use the predetermined software application memory address to forward interrupts to the old software application.

6. The method of claim 1, wherein the boot-loader is stored in one or more individually erasable memory pages.

7. The method of claim 1, wherein the boot-loader contains no instructions configured to use the radio communication logic directly.

8. The method of claim 1, wherein the old firmware module is a pre-linked binary image.

9. The method of claim 1, wherein the old software application comprises instructions configured to cause the processing system to execute instructions in the old firmware module for using the radio communication logic to receive the new firmware module.

10. The method of claim 1, wherein the new firmware module is received from a remote device, the method further comprising the old software application passing information to the boot-loader or to the old firmware module for re-establishing radio connection with the remote device if connection is lost.

11. The method of claim 1, further comprising the processing system executing instructions configured to check that the new firmware module has been correctly received.

12. The method of claim 1, wherein the old firmware module is located at a predetermined firmware memory address, the method further comprising the new firmware module being moved or copied to the predetermined firmware memory address.

13. The method of claim 1, wherein the old software application is a pre-linked binary image.

14. The method of claim 1, further comprising memory protection logic preventing code in the software application memory region of the non-volatile memory from directly reading and/or writing to and/or executing addresses in the firmware memory region of the non-volatile memory.

15. An integrated-circuit radio communication device comprising:
a processing system;
a non-volatile memory; and
radio communication logic, wherein:
the non-volatile memory stores (i) a boot-loader, (ii) an old firmware module in a firmware memory region of the non-volatile memory, and (iii) an old software application in a software application memory region of the non-volatile memory, wherein the old firmware module comprises instructions configured to control the radio communication logic according to a predetermined radio protocol, and wherein the old software application comprises instructions configured to invoke a radio communication function of the old firmware module;
the boot-loader or the old firmware module comprises instructions configured to use the radio communication logic to receive a new firmware module, and the boot-loader or the old firmware module comprises instructions configured to store the new firmware module in the software application memory region of the non-volatile memory such that at least a portion of the old software application is overwritten by the new firmware module;
the boot-loader comprises instructions configured to move or copy the new firmware module from the software application memory region of the non-volatile memory to the firmware memory region of the non-volatile memory;
the boot-loader or the new firmware module comprises instructions configured to use the radio communication logic to receive a new software application; and
the boot-loader or the new firmware module comprises instructions configured to store the new software application in the software application memory region of the non-volatile memory.

16. The integrated-circuit radio communication device of claim 15, wherein the boot-loader or the old firmware module comprises instructions configured to completely overwrite the old software application with the new firmware module.

17. The integrated-circuit radio communication device of claim 15, wherein the instructions in the boot-loader and/or the old firmware module are such that the storing of the new firmware module in the software application memory region of the non-volatile memory overlaps in time with the receiving of the new firmware module.

18. The integrated-circuit radio communication device of claim 15, wherein the old software application is located at a predetermined software application memory address, and wherein the boot-loader or the old firmware module comprises instructions configured to store the new firmware module at the predetermined software application memory address.

19. The integrated-circuit radio communication device of claim 18, wherein the old firmware module is arranged to use the predetermined software application memory address to forward interrupts to the old software application.

20. The integrated-circuit radio communication device of claim 15, wherein the boot-loader is stored in one or more individually erasable memory pages.

21. The integrated-circuit radio communication device of claim 15, wherein the boot-loader contains no instructions configured to use the radio communication logic directly.

22. The integrated-circuit radio communication device of claim 15, wherein the old firmware module is a pre-linked binary image.

23. The integrated-circuit radio communication device of claim 15, wherein the old software application comprises instructions configured to cause the processing system to execute instructions in the old firmware module for using the radio communication logic to receive the new firmware module.

24. The integrated-circuit radio communication device of claim 15, wherein the boot-loader or the old firmware module comprises instructions configured to receive the new firmware module from a remote device, and wherein the old software application comprises instructions configured to pass information to the boot-loader or to the old firmware module for re-establishing radio connection with the remote device if connection is lost.

25. The integrated-circuit radio communication device of claim 15, wherein the boot-loader or the old firmware module comprises instructions configured to check that the new firmware module has been correctly received.

26. The integrated-circuit radio communication device of claim 15, wherein the old firmware module is located at a predetermined firmware memory address, and wherein the boot-loader comprises instructions configured to move or copy the new firmware module to the predetermined firmware memory address.

27. The integrated-circuit radio communication device of claim 15, wherein the old software application is a pre-linked binary image.

28. The integrated-circuit radio communication device of claim 15, further comprising memory protection logic arranged to prevent code in the software application memory region of the non-volatile memory from directly reading and/or writing to and/or executing addresses in the firmware memory region of the non-volatile memory.

* * * * *